T. PARKER.
ATTACHMENT TO FANNING MILLS.
APPLICATION FILED NOV. 28, 1913.

1,120,844.

Patented Dec. 15, 1914.
2 SHEETS—SHEET 1.

WITNESSES

INVENTOR
T. Parker
By
Attorney.

T. PARKER.
ATTACHMENT TO FANNING MILLS.
APPLICATION FILED NOV. 28, 1913.

1,120,844.

Patented Dec. 15, 1914.

2 SHEETS—SHEET 2.

WITNESSES

INVENTOR

By

Attorney.

UNITED STATES PATENT OFFICE.

THOMAS PARKER, OF RAPID CITY, MANITOBA, CANADA.

ATTACHMENT TO FANNING-MILLS.

1,120,844.  Specification of Letters Patent.  Patented Dec. 15, 1914.

Application filed November 28, 1913. Serial No. 803,622.

*To all whom it may concern:*

Be it known that I, THOMAS PARKER, of the town of Rapid City, in the Province of Manitoba, Canada, have invented certain new and useful Improvements in Attachments to Fanning-Mills, of which the following is the specification.

The invention relates to an attachment to a fanning mill and the object of the invention is to provide an attachment which will feed the grain from the hopper to the screens of the mill under all working conditions without clogging or choking and will distribute it evenly over the screens when working.

With the above object in view the invention consists essentially in a sieve inserted in the screen box above the top screen of the ordinary mill and directly beneath the feed opening of the hopper and a semi-circular strip carried by the sieve, the parts being arranged and constructed as hereinafter more particularly described and later pointed out in the appended claims.

Figure 1:
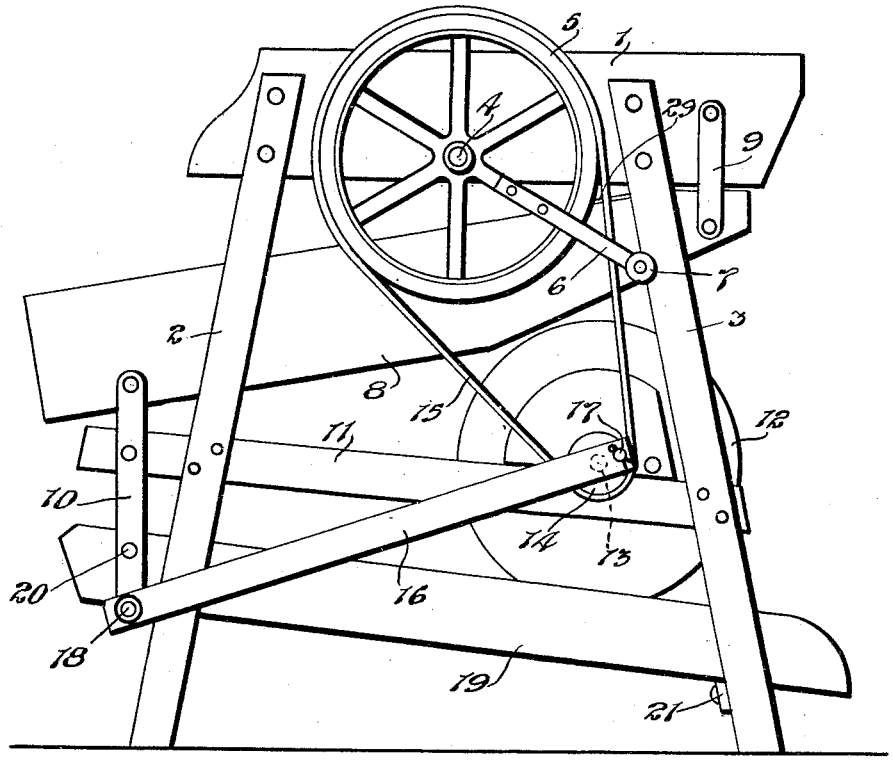
Figure 2:
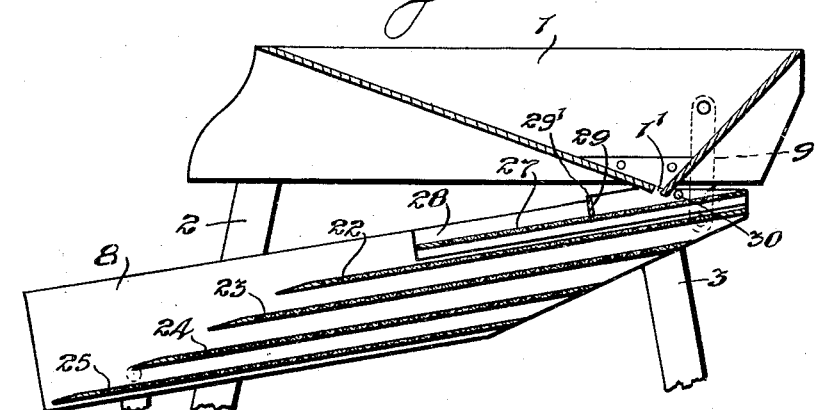
Figure 3:
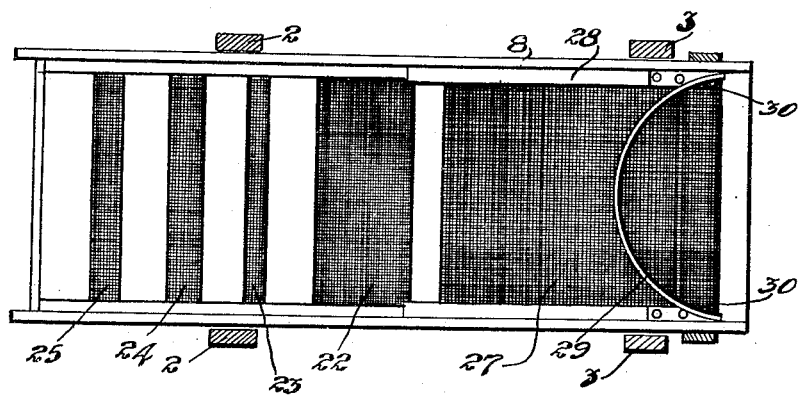
Figure 4:
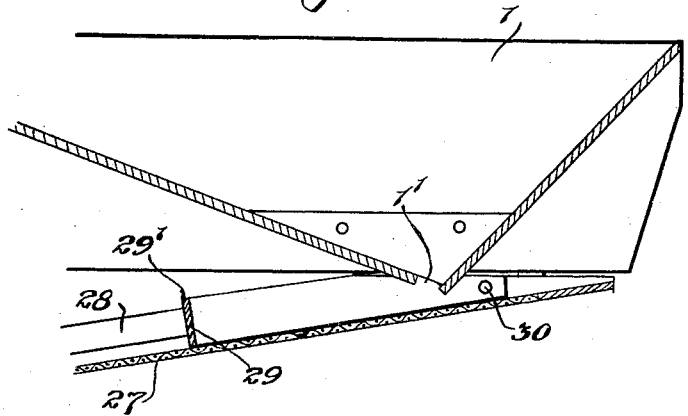

Figure 1 represents a side view of an ordinary fanning mill equipped with my invention. Fig. 2 represents a vertical sectional view centrally through the upper portion of the mill. Fig. 3 represents a plan view of the screen box and inserted sieve, certain parts being shown in horizontal section. Fig. 4 represents an enlarged detailed vertical sectional view through a portion of the hopper and a portion of the inserted sieve.

In the drawings like characters of reference indicate corresponding parts in each figure.

1 represents a hopper carried by pairs of legs 2 and 3 and 4 a stub shaft permanently mounted on the hopper and carrying rotatably a fly wheel 5 fitted with a crank 6 supplied with a hand piece 7.

8 represents a screen box supported at one end by hangers 9 pivotally secured to the hopper and the box and at the other end by pivoted side levers 10 carried by cross braces 11 secured to the legs 2 and 3, the upper ends of the levers being pivotally connected to the screen box.

12 represents a fan casing and 13 a fan shaft, the shaft being suitably mounted on the braces 11.

14 is a pulley mounted on the fan shaft and connected through a belt 15 with the fly wheel, this arrangement being such that when the fly wheel is rotated the fan within the fan box is operated.

A pitman rod 16 is secured by an eccentric pin 17 to the pulley 14 and by a bolt 18 to the lower end of the front lever 10.

19 represents the shoe of the fanning mill having the forward end connected to the side levers 10 by pivot pins 20 and the rear end riding on a suitable cross piece 21 passing between the legs 3.

The screen box is supplied in the present instance with screens 22, 23, 24 and 25, the screen 22 being located beneath the outlet opening 1' of the hopper.

The above parts are all of ordinary construction being found in practically all of the fanning mills now on the market and as they form no part of my invention I have not considered it necessary to enter into a detailed explanation of them.

In applying my invention to the ordinary machine the ordinary stationary trough is entirely dispensed with and an oscillating attachment is applied which absolutely prevents the straw or chaff from clogging the feed opening and provides an even feed at all times when the machine is operating and further insures the stopping of the feed automatically when the machine is not working.

The attachment is now described.

27 represents a sieve carried by a suitable frame 28. This frame is arranged to slide into the screen box directly above top screen 22 thereof, the sieve 27 then being interposed between the feed opening 1' and the top screen.

29 is a semi-circular strip located on the top face of the sieve and having the ends thereof permanently secured at 30 to the frame 28. This strip is designed so that it has the upper edge 29' thereof located above the horizontal plane containing the feed opening 1'. Accordingly all material passed onto the sieve, other than that which escapes through the sieve, has to be shaken or agitated over the strip 29 and if the said sieve with strip is not agitated the feed through the opening 1' will be obviously automatically cut off owing to the material being caused to bank up into the feed opening by the action of the strip.

As the invention is of particular advantage when cleaning grain mixed with chaff or straw I will now describe the operation considering this mixture which is commonly met in actual practice placed in the hopper.

As the mill is operated by the turning of the crank the material fed through the feed opening is caught by the sieve which of course is being agitated. The sieve initially fills up to the height of the band and then afterward the material flows over, by agitation, the upper edge of the band where it is caught by the screen 22 and passed to the succeeding screens in the ordinary way. No clogging can occur as the grain and chaff will be constantly thrown over the band by the agitation of the sieve box. It is unnecessary at any time during the operation of cleaning, to close the feed opening by a gate or otherwise as once the machine is stopped the material ceases to flow over the upper edge of the strip and consequently the grain will bank up and fill the feed opening. The semi-circular shape of the band provides a very even distribution of the grain over the top sieve and so increases the capacity of the mill and provides a much more effective cleaning of the grain than is otherwise had.

What I claim as my invention is;

1. In a fanning mill the combination with a hopper supplied with the usual feed opening and an oscillating screen box presenting screens designed to receive material passed through the feed opening, of a sieve inserted within the screen box between the feed opening and the adjoining screen and a semi-circular strip located on the upper face of the sieve and passing across the same, as and for the purpose specified.

2. In a fanning mill the combination with a hopper supplied with the usual feed opening and an oscillating screen box presenting screens designed to receive material passed through the feed opening, of a sieve carried by a suitable frame inserted within the screen box and located above the top screen thereof and the feed opening of the hopper and a semicircular cross strip located on the upper face of the sieve said cross strip having the upper edge thereof located above a horizontal plane containing the feed opening, as and for the purpose specified.

Signed at Rapid City this 28th day of August 1913.

THOMAS PARKER.

In the presence of—
W. SWANN,
B. B. SINGLEY.

Copies of this patent may be obtained for five cents each, by addressing the "Commissioner of Patents, Washington, D. C."